United States Patent
Lejin P J

(10) Patent No.: US 11,922,003 B2
(45) Date of Patent: Mar. 5, 2024

(54) REFLECTING DATA INPUT INTO FIELDS OF A SCROLLABLE USER INTERFACE

(71) Applicant: Salesforce, Inc., San Francisco, CA (US)

(72) Inventor: Jose Lejin P J, Karnataka (IN)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/814,150

(22) Filed: Jul. 21, 2022

(65) Prior Publication Data

US 2024/0028191 A1    Jan. 25, 2024

(51) Int. Cl.
*G06F 3/0485* (2022.01)
*G06F 3/0481* (2022.01)

(52) U.S. Cl.
CPC .......... *G06F 3/0485* (2013.01); *G06F 3/0481* (2013.01)

(58) Field of Classification Search
None
See application file for complete search history.

(56) References Cited

U.S. PATENT DOCUMENTS

| | | | | |
|---|---|---|---|---|
| 10,936,804 B2 * | 3/2021 | Gordon | | G06F 40/18 |
| 11,017,165 B2 * | 5/2021 | Dvorak | | G06F 40/174 |
| 2008/0235064 A1 * | 9/2008 | Gulko | | H01L 21/28035 |
| | | | | 257/E21.133 |
| 2009/0113283 A1 * | 4/2009 | Sol | | G06F 40/18 |
| | | | | 715/212 |
| 2016/0253307 A1 * | 9/2016 | Kraynak | | G06F 40/18 |
| | | | | 715/212 |
| 2019/0340219 A1 * | 11/2019 | Schoedl | | G06F 3/0481 |
| 2020/0042588 A1 * | 2/2020 | Sagalovskiy | | G06F 8/427 |
| 2021/0099565 A1 * | 4/2021 | Sansanwal | | G06F 3/1454 |
| 2021/0109629 A1 * | 4/2021 | Reynolds | | G06F 3/0482 |
| 2022/0398140 A1 * | 12/2022 | Singh | | G06F 9/54 |

* cited by examiner

*Primary Examiner* — Haimei Jiang
(74) *Attorney, Agent, or Firm* — Sterne, Kessler, Goldstein & Fox P.L.L.C.

(57) ABSTRACT

A user device (e.g., a computing device, a smart device, a mobile device, a laptop, a tablet, a set-top box, a display device, etc.) may generate and/or display a scrollable user interface (e.g., a configuration form/interface, a web form, a web page, an application page, a data form, etc.) that includes data fields. A data reflection element for a data field that is displayed based on proximity of an interactive element to the data field may be generated. Based on an interaction with the data reflection element via the interactive element, data input to the data field may be displayed in a field of a data reflection window of the scrollable user interface. An indication element that indicates correspondence between the data field and the field of the data reflection window may also be displayed.

20 Claims, 9 Drawing Sheets

Configuration Form
Configure instance details based on your requirements

Field Name 1
Field Name 2
Field Name 3
Field Name 4
Field Name 5
Field Name 6
Field Name 7
Field Name 8

REFLECTING DATA INPUT INTO FIELDS OF A SCROLLABLE USER INTERFACE

BACKGROUND

Web application pages, user interface (UI) pages, and/or the like are used to manage data for specific intents, for example, such as data used to configure network management devices, cloud-based systems (e.g., software as a service (SaaS) systems/components, etc.), private/public networks, and/or the like. Data, such as configuration information and/or the like, required to implement a specific intent often includes a large number of input elements that are presented to and/or requested as input from a user via a long data collection form (e.g., web form, online interface, etc.) spanning multiple pages. Data required as input to a field on a first page of a long data collection form may also be required as input in fields on the same page or different pages of the long data collection form (e.g., for reference, etc.). When a user needs to refer to the data input to the field on the first page to input the data in a field on the same page or a different page of the long data collection form, the user must scroll up and down for reference. Scrolling up and down a long data collection form for reference in an attempt to update data within a field into another field expends computing resources, is also time-consuming and error-prone, and also affects the usability of the end-user.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 2A shows an example of a scrollable user interface, according to some aspects.

FIG. 2C shows an example of a scrollable user interface where data from fields is reflected in a data reflection window, according to some aspects.

FIG. 2E shows an example of a scrollable element for a data reflection window, according to some aspects.

DETAILED DESCRIPTION

Provided herein are system, apparatus, device, method, computer program product embodiments, and/or combinations and sub-combinations thereof, for reflecting data input into fields of a scrollable user interface. A user device (e.g., a computing device, a smart device, a mobile device, a laptop, a tablet, a set-top box, a display device, etc.) may generate and/or display a scrollable user interface (e.g., a configuration form/interface, a web form, a web page, an application page, a data form, etc.). The scrollable user interface may include various data fields (e.g., form fields, input elements, etc.). The user device may enable data fields at various portions and/or pages of the scrollable user interface to be viewed, visited, accessed, requested, and/or navigated to, for example, based on interaction with a scrollable element (e.g., a scroll bar, directional arrow(s), a graphical indicator, etc.). According to some aspects, the user device may facilitate and/or implement reflection (e.g., representation, copy, presentation, etc.) of data input into a data field of the scrollable user interface by tracking interaction with a data reflection element generated for the data field and generating a data reflection window that represents and/or presents the data input into the data field for reference.

A user may select fields of a scrollable user interface for which data input into selected fields is reflected in fields of an optimally positioned data reflection window. The data reflection window is a tool that helps users easily reference data input to a field on a first page to input the data in a field on the same page or a different page of a scrollable user interface without the expense of computation resources, excess time, bad usability, and/or the opportunity for error associated with scrolling scroll up and/or down for reference. These and other technological advantages are described herein.

Figure 1:
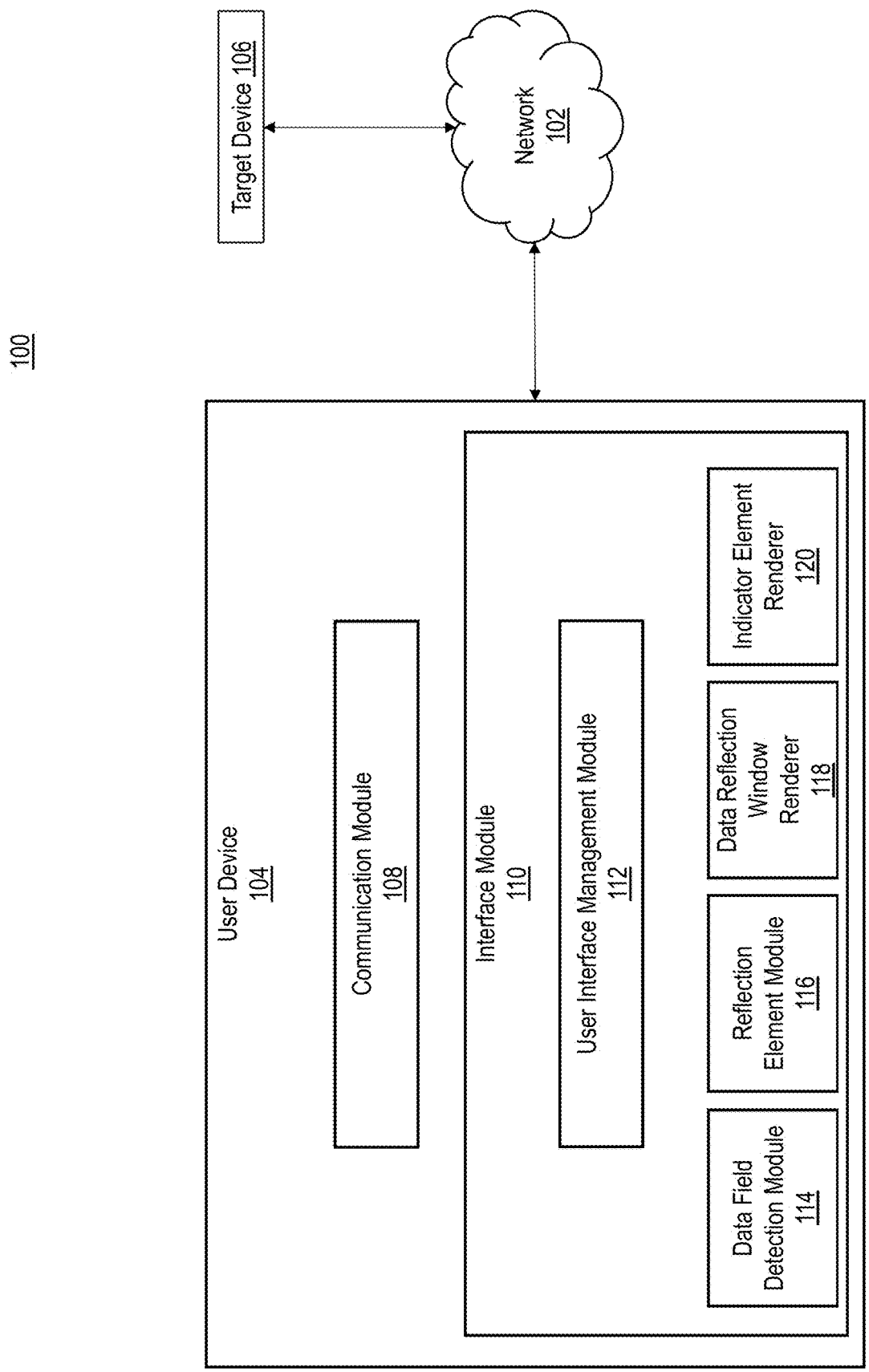
FIG. 1 shows an example system for reflecting data input into fields of a scrollable user interface, according to some aspects.

FIG. 1 shows an example system 100 for reflecting data input into fields of a scrollable user interface. The system 100 is merely an example of one suitable system environment and is not intended to suggest any limitation as to the scope of use or functionality of aspects described herein. Neither should the system 100 be interpreted as having any dependency or requirement related to any single module/component or combination of modules/components described therein.

The system 100 may include a network 102. The network 102 may include a packet-switched network (e.g., internet protocol-based network), a non-packet switched network (e.g., quadrature amplitude modulation-based network), and/or the like. The network 102 may include network adapters, switches, routers, modems, and the like connected through wireless links (e.g., radiofrequency, satellite) and/or physical links (e.g., fiber optic cable, coaxial cable, Ethernet cable, or a combination thereof). The network 102 may include public networks, private networks, wide area networks (e.g., Internet), local area networks, and/or the like. The network 102 may include a content access network, content distribution network, and/or the like. The network 102 may provide and/or support communication from telephone, cellular, modem, and/or other electronic devices to and throughout the system 100. For example, the system 100 may include a user device 104 in communication with a target device 106 via the network 102.

According to some aspects, the user device 104 may include, for example, a smart device, a mobile device, a laptop, a tablet, a display device, a computing device, or any other device capable of communicating with the target device 106. The user device 104 may include a communication module 108 that facilitates and/or enables communication with the network 102 (e.g., devices, components, and/or systems of the network 102, etc.), the target device 106, and/or any other device/component of the system 100. For example, the communication module 108 may include hardware and/or software to facilitate communication. The communication module 108 may comprise one or more of a modem, transceiver (e.g., wireless transceiver, etc.), digital-to-analog converter, analog-to-digital converter, encoder, decoder, modulator, demodulator, tuner (e.g., QAM tuner, QPSK tuner), and/or the like. The communication module 108 may include any hardware and/or software necessary to facilitate communication.

According to some aspects, the user device 104 may include an interface module 110. The interface module 110 enables a user to interact with the user device 104, the network 102, the target device 106, and/or any other device/component of the system 100. The interface module 110 may include any interface for presenting and/or receiving information to/from a user.

The target device 106 may include a computing device, a network device, a cloud-device/component, an Internet-of-Things (IoT) device, a smart device, a system device, and/or any other type of device and/or system component. According to some aspects, the target device 106 may be any device, network, and/or system that may be configured by the user device 104, for example, via the user interface management module 112

According to some aspects, the interface module 110 may include the user interface management module 112. The user interface management module 112 enables a user to view web application documentation and/or content, application pages, webpages, and/or any other page of a multipage user interface. For example, the user interface management module 112 may be used to access and/or view pages and/or the like of an application configured with, and/or accessible by the user device 104. The user interface management module 112 may be used to access various data fields of scrollable pages and/or the like of a user interface (e.g., the interface module, a scrollable user interface, etc.) generated by, configured with, and/or accessible by the user device 104.

According to some aspects, the user interface management module 112 may include a web browser (e.g., Internet Explorer®, Mozilla Firefox®, Google Chrome®, Safari®, or the like). The user interface management module 112 may request/query and/or send/provide various files from a local source and/or a remote source, such as the target device 106, and/or the like. The user interface management module 112 may access, process, and view information, web forms, web pages, and/or applications available to it from the system 100 via the network 102.

According to some aspects, the interface module 110 may include one or more input devices and/or components, for example, such as a keyboard, a pointing device (e.g., a computer mouse, remote control), a microphone, a joystick, a tactile input device (e.g., touch screen, gloves, etc.), and/or the like. According to some aspects, interaction with the input devices and/or components may enable a user to view, access, request, and/or navigate a scrollable user interface generated and/or displayed by the interface module 110 and/or accessible via the user interface management module 112. According to some aspects, interaction with the input devices and/or components may enable a user to manipulate and/or interact with components of a scrollable user interface, for example, such as data fields, interactive elements, data reflection windows, and/or the like.

According to some aspects, the interface module 110 may include a field detection module 114. The data field detection module 114 may detect and/or identify data fields of a user interface, such as a scrollable user interface used to configure the target device 106 and/or any other user interface. For example, the field detection module 114 may perform code/script analysis (e.g., JavaScript analysis, etc.), form field recognition, and/or any other technique to detect and/or identify data fields of a user interface. According to some aspects, the field detection module 114 may communicate with a reflection element module 116 of the interface module 110. The field detection module 114 may communicate data/information indicative of each data field of a user interface, such as a scrollable user interface and/or the like, that is generated, viewed, visited, accessed, requested, and/or navigated to by the user device 106. The reflection element module 116 may use the data/information indicative of each data field of a user interface, such as a scrollable user interface and/or the like, that is generated, viewed, visited, accessed, requested, and/or navigated to by the user device 106 to generate, render, and/or cause to be displayed reflection elements (e.g., reflective icons, interactive elements, etc.), for example, within proximity to, next to, and/or associated with each data field of a scrollable user interface. According to some aspects, a reflective element may be displayed and/or rendered whenever a data field is selected, hovered over, and/or the like. For example, a reflective element may be displayed and/or rendered based on the proximity of an interactive element (e.g., a curser, a pointer, a selector, etc.) to the data field. According to some aspects, a reflective element may be displayed and/or rendered whenever data is input into a data field of a scrollable interface.

FIG. 2A shows an example of a scrollable user interface 200 generated, accessed, and/or displayed by the interface module 110. The scrollable user interface 200 may include a plurality of data fields, for example, such as data fields 204a and 204b. The scrollable user interface 200 may include a scrollable element 202 (e.g., a scroll bar, directional arrow(s), a graphical indicator, etc.). The scrollable element 202 may be used to move contents and/or portions of the scrollable user interface 200 into various areas of a viewable area 204. For example, interaction with the scrollable element 202 may cause a location of data fields (e.g., data field 204a, data field 204b, etc.) of the scrollable user interface 202 to move up and/or down within the viewable area 204.

A reflective element 206 may be displayed and/or rendered whenever the data field 204b is selected, hovered over, and/or the like. For example, the reflective element 206 may be displayed and/or rendered based on the proximity of an interactive element 208 (e.g., a curser, a pointer, a selector, etc.) to the data field 204b. According to some aspects, the reflective element 206 may be displayed and/or rendered whenever data is input into the data field 204b.

Returning to FIG. 1, according to some aspects, the user device 104 may facilitate and/or implement reflection (e.g., representation, copy, presentation, etc.) of data input into a data field of a scrollable user interface by tracking interaction with a data reflection element generated for the data field and generating a data reflection window that represents and/or presents the data input into the data field for reference. For example, according to some aspects, the interface module 110 may include a data reflection window renderer 118. The reflection element module 116 may communicate with and/or notify the data reflection window renderer 118 whenever interaction with a reflective element associated with a data field is detected, determined, and/or identified. For example, The user device 104 may include and/or encode event listeners that listen and/or monitor events associated with a user interface (e.g., scrollable interface 200, etc.), for example, such as an interaction with a reflective element and/or the like, and inform components of the interface module 110, such as the data reflection window renderer 118 and/or the like. The data reflection window renderer 118 may generate, render, and/or present a data reflection window that includes data fields that include data and/or information that reflects data and/or information input into a data field.

According to some aspects, the data reflection window renderer 118 may generate, render, and/or present a data reflection window that includes data fields that include data and/or information that reflects data and/or information input into a data field using a dynamic, lightweight, interpreted, and/or just-in-time compiled programming language with first-class function that may be implemented via a pluggable application and/or the like. For example, the data reflection window renderer 118 may generate, render, and/or present a data reflection window that includes data fields that include data and/or information that reflects data and/or information input into a data field by using a just-in-time compiled programming language such as JavaScript, Typescript, Dart, ClojureScript, Ruby, Python, and/or the like. For example, a JavaScript with dynamic generation of a Document Object Model (DOM) and Cascading Style Sheets (CSS) may be used to generate, render, and/or cause the display of data and/or information input into a data field in a field reflected in a data refection window. The user device 104 may use and/or implement any programming language to generate, render, and/or cause the display of data and/or information input into a data field in a field reflected in a data refection window.

According to some aspects, EXAMPLE 1 below shows example coding that may be used and/or implemented by the interface module 110 (e.g., the data reflection window renderer 118, etc.) to reflect data and/or information input into a data field in a field of a data refection window.

Example 1 const sourceInputFieldToReflect=document.getElementById ('source');
const reflectInputField=document.getElementById('reflection');
const inputHandler=function(e) {
reflectInputField.innerHTML=e.target.value;
}
source.addEventListener('sourceInputFieldToReflect', inputHandler);

As used in EXAMPLE 1, 'source' corresponds to a data field with which an associated reflection element has been interacted (e.g., a user clicks the reflection element 206, etc.). As used in EXAMPLE 1, 'reflection' corresponds to a field of a generated data reflection window with a label of the source data field. As used in EXAMPLE 1, "const inputHandler=function(e)" is an event listener that auto generates for all input fields a scrollable user interface, and "source.addEventListener" is the generated listener that attaches to all input fields in the scrollable user interface and detects whenever an interaction with a reflection element occurs. As used in EXAMPLE 1, "reflectInputField.innerHTML=e.target.value," causes the current value of data input to a data field to be reflected in a field of a data reflection window.

According to some aspects, a data reflection window generated and/or rendered by the data reflection window renderer 118 may be displayed at a location of a scrollable user interface that remains fixed when the scrollable user interface is scrolled. The location of the scrollable user interface may be changed according to selection and/or interaction, for example, via the interactive element.

According to some aspects, the interface module 110 may include an indicator element renderer 120. The data reflection window renderer 118 may communicate with and/or notify the indicator element renderer 120 whenever a data reflection window is generated and/or rendered. The indicator element renderer 120 may generate, render, and/or cause the display of an indicator element (e.g., an arrow, a dotted line, etc.) that indicates correspondence between a data field and the field of a data reflection window. According to some aspects, the indicator element renderer 120 uses scalable vector graphics (SVG) and/or the like to generate, render, and/or cause the display of an indicator element (e.g., an arrow, a dotted line, etc.) that indicates correspondence between a data field and the field of a data reflection window. An indicator element may overlay a scrollable interface and may event listeners may be used to detect, determine, and/or identify whenever a location/position of a data field changes so that the indicator element may adjust to the changed location/position. For example, event listeners may be used to adjust and/or correct an angle of connection between a data field and a field of a data reflection window based on a scroll (e.g., scroll up, scroll down, scroll left, scroll right, etc.) of a scrollable interface.

Figure 2B:
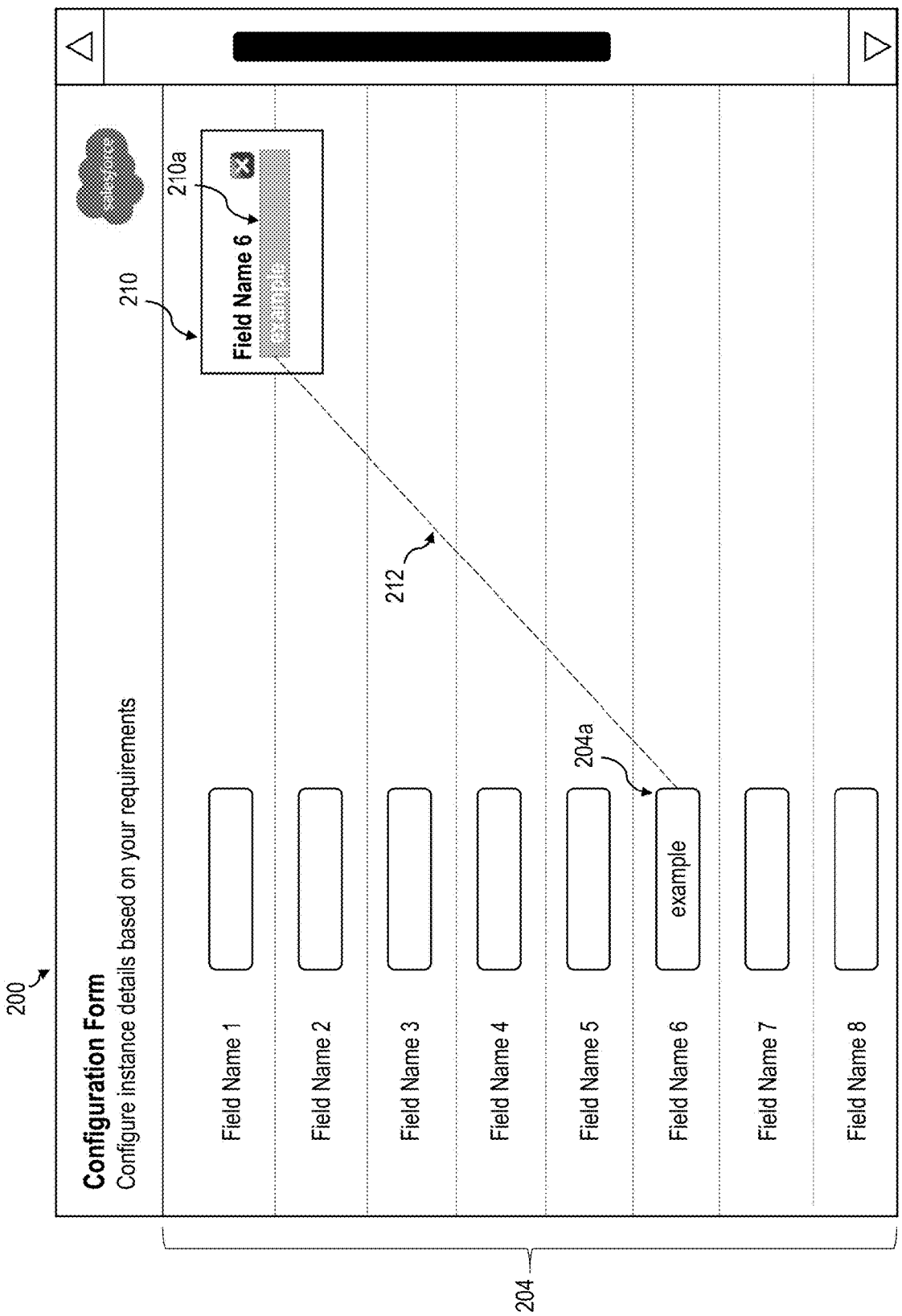
FIG. 2B shows an example of a scrollable user interface where data from fields is reflected in a data reflection window, according to some aspects.

FIG. 2B shows an example of a scrollable user interface where data input to a data field is reflected in a data reflection window, according to some aspects. The scrollable user interface 200 displays a data reflection window 210, for example, based on an interaction with the reflective element 206. As shown, text data "example" input to the data field 204a is reflected in a field of the data reflection window 210 that has the same field name "Field Name 6," as the data field 204a. An indicator element 212 indicates correspondence between the data field 204a and field 210a of the data reflection window 210.

Figure 2C:
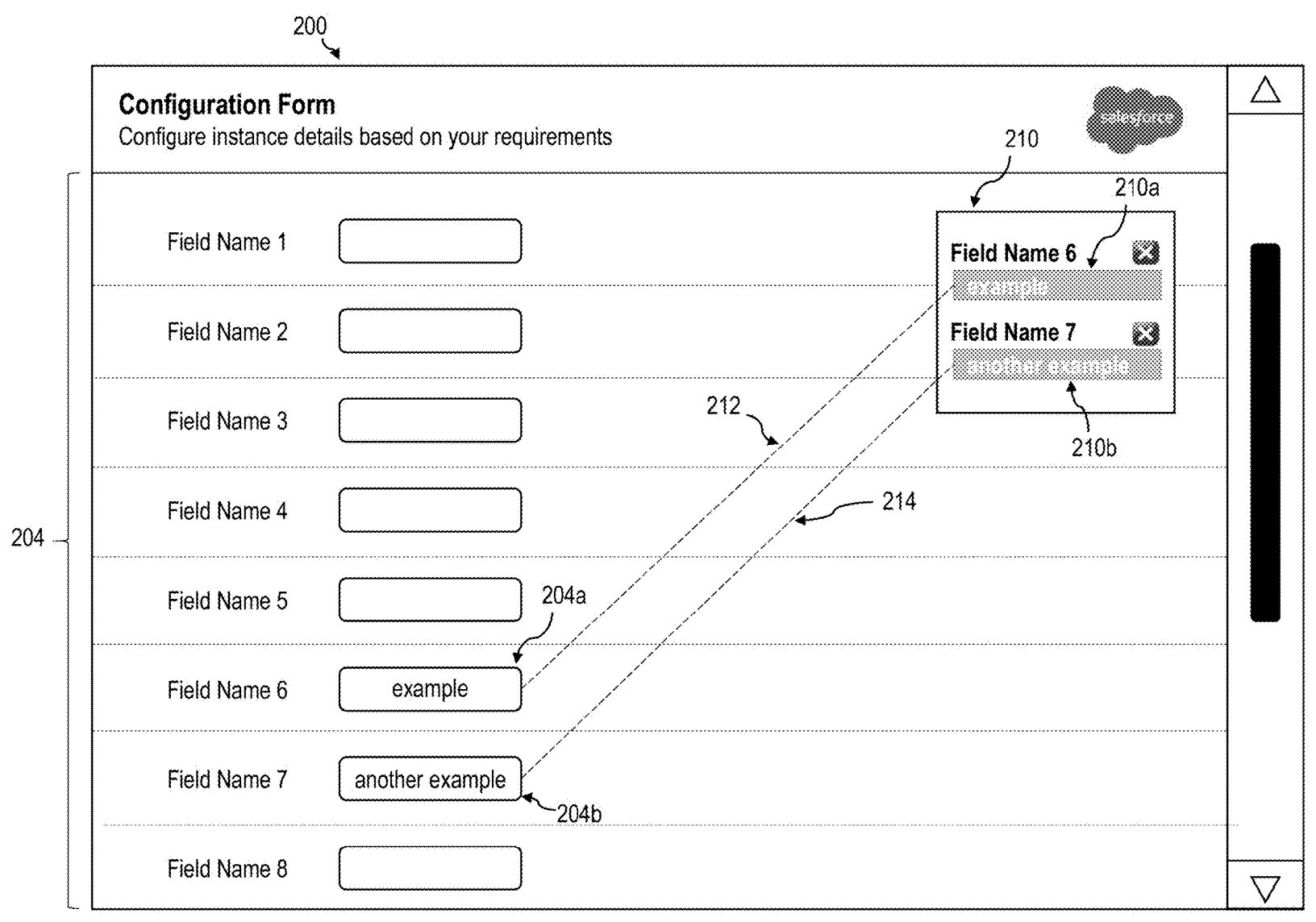

Returning to FIG. 1, according to some aspects, the data reflection window renderer 118 may append a corresponding field to a data reflection window for each data field of a scrollable user interface for which a respective reflective element receives an interaction. According to some aspects, fields appended to a data reflection window may be arranged in a sequence that reflects an order in which reflective elements for data fields are interacted with. FIG. 2C shows an example of scrollable user interface 200 where the data reflection window 210 includes a field 210b that corresponds to the data field 204b. An indicator element 214 indicates correspondence between the data field 204b and field 210b of the data reflection window 210.

Figure 2D:
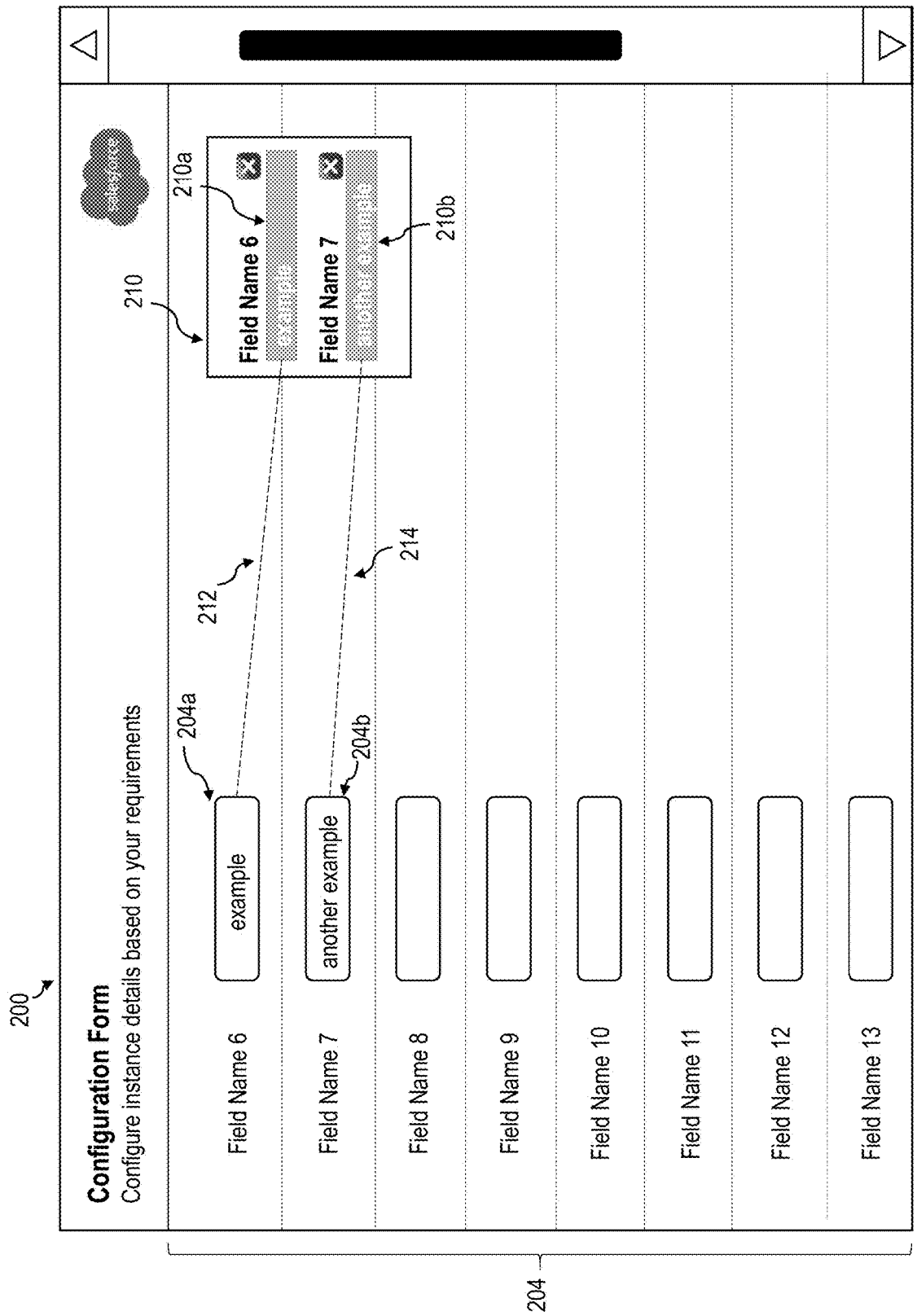
FIG. 2D shows an example of a scrollable user interface where data from fields is reflected in a data reflection window, according to some aspects.

FIG. 2D shows an example of the scrollable user interface 200 where the angle and/or position of the indicator element 212 has been adjusted and/or corrected between the data field 204a and field 210a, and the angle and/or position of the indicator element 214 has been adjusted and/or corrected between the data field 204b and field 210b based on a scroll (e.g., scroll down, etc.) of the scrollable interface 200.

Returning to FIG. 1, according to some aspects, the data reflection window renderer 118 may generate, render, and/or present a scrollable element for a data reflection window. For example, the data reflection window renderer 118 may generate a scrollable element for a data reflection window based on the amount of fields of the data reflection window exceeding a field display threshold for the data reflection window. The scrollable element may include, for example, a scroll bar, a directional arrow(s), a graphical indicator, and/or the like. The data reflection window renderer 118 causes additional fields and/or overflow fields (e.g., fields that do not fix within a viewable area, etc.) to be displayed within the data reflection window based on an interaction with the scrollable element.

Figure 2E:
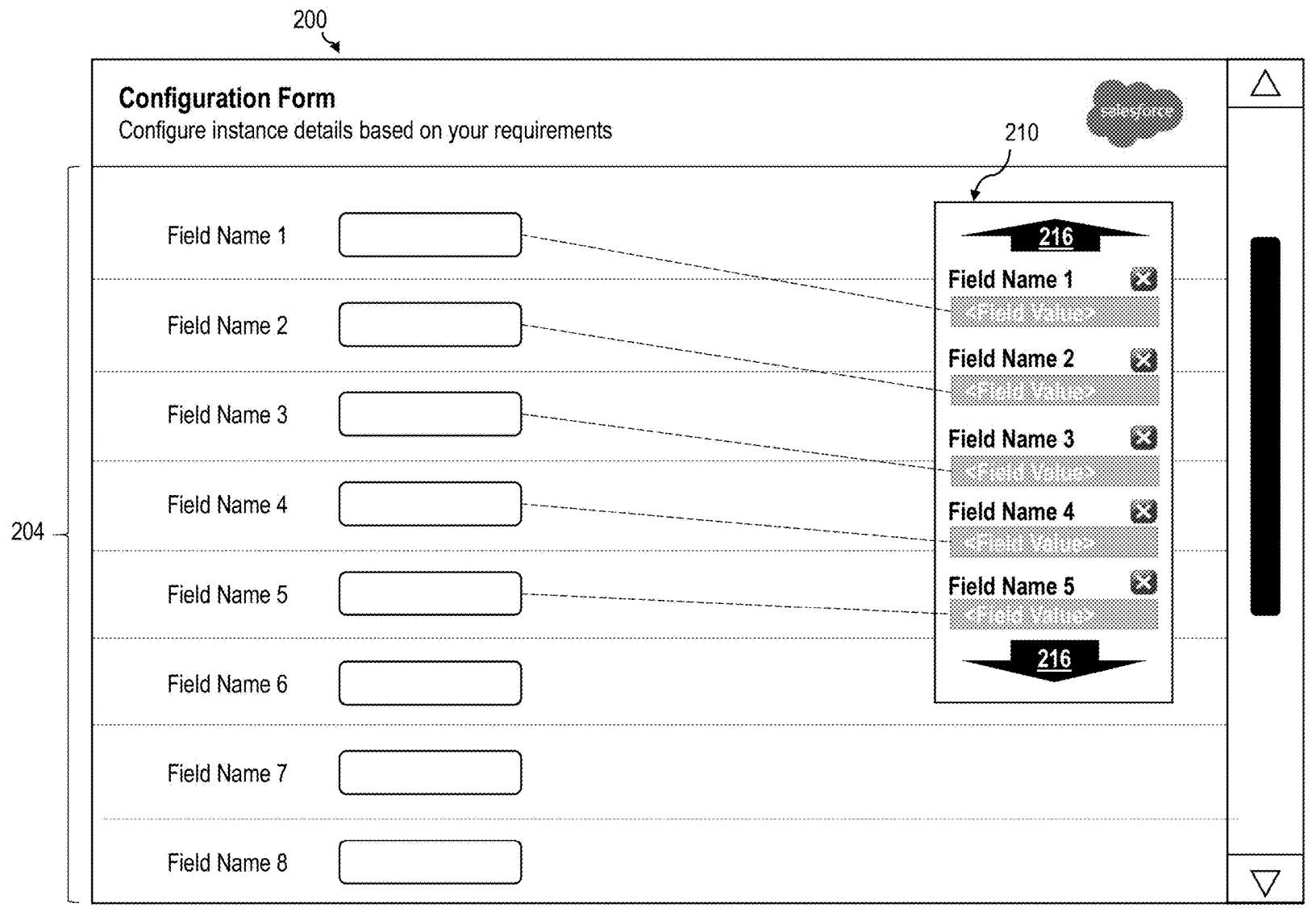

FIG. 2E shows an example of the scrollable user interface 200 where a scrollable element 216 has been generated and/or rendered for the data reflection window 210. The scrollable element 216 is generated based on a quantity of fields of the data reflection window 210 exceeding a field display threshold for the data reflection window 210. Additional fields and/or overflow fields (e.g., fields that do not fix within a viewable area, etc.) of the data reflection window 210 may be displayed within the data reflection window 210 based on an interaction with the scrollable element 216.

Figure 3:
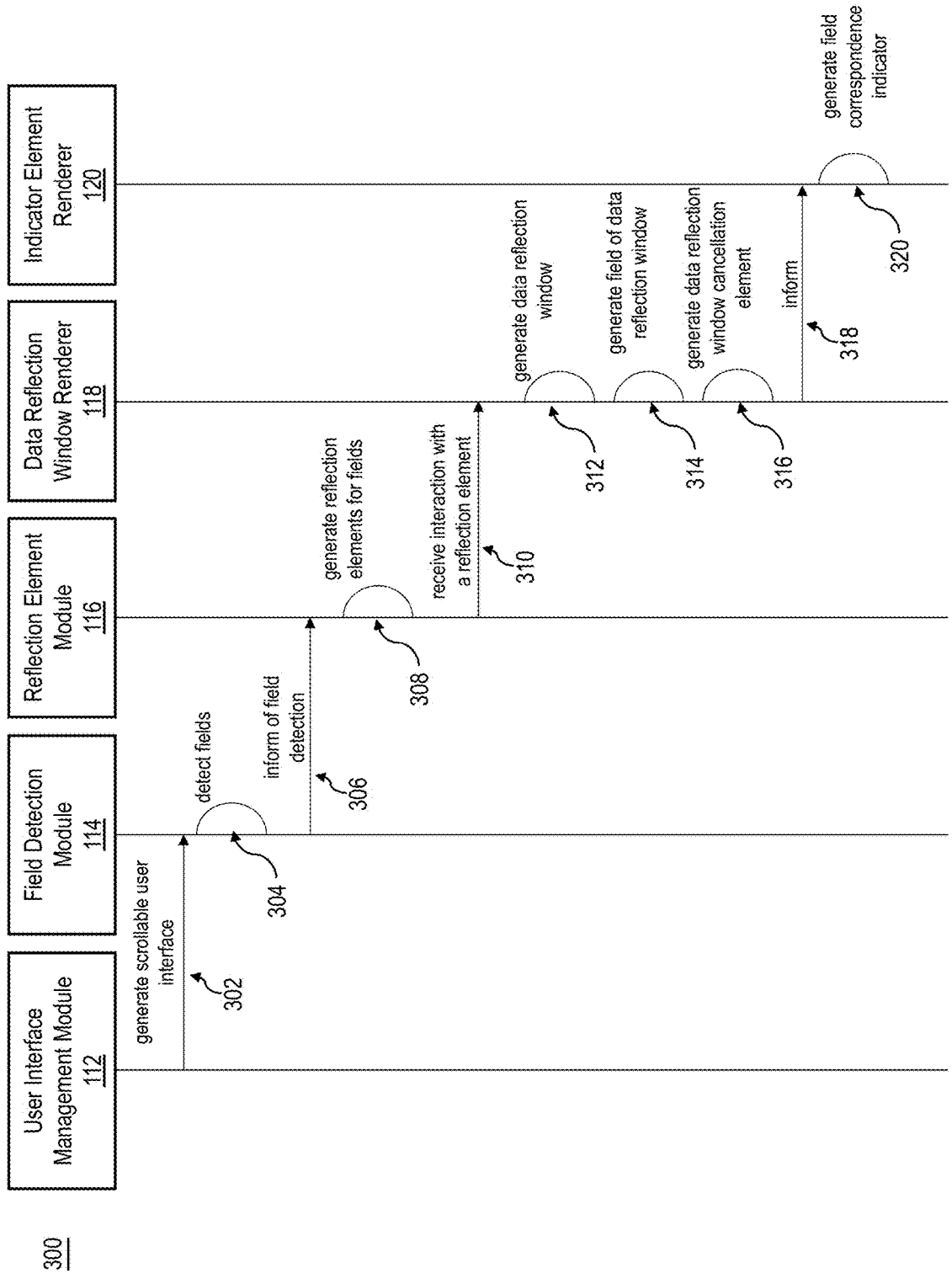
FIG. 3 shows an example communication diagram for reflecting data input into fields of a scrollable user interface, according to some aspects.

According to some aspects, FIG. 3 shows an example communication diagram 300 for reflecting data input into fields of a scrollable user interface. The communication diagram 300 depicts communications between and/or actions performed by components of the user device 104 of FIG. 1., such as the user interface management module 112, the field detection module 114, the reflection element module 116, the data reflection window renderer 118, and the indicator element renderer 120. The communications between and/or actions performed by components of the user device 104 enable a user to select which data fields of a scrollable user interface are reflected in an optimally positioned data reflection window that provides a reference to data input into the selected data fields.

In 302, the user interface management module 112 facilitates navigation to one or more pages of a multipage user interface. For example, the user interface management module 112 generates, launches, and/or causes to be displayed a user interface. The interface may be, for example, a scrollable user interface such as a long web form and/or the like. The scrollable user interface may include a plurality of data fields to which data and/or information may be input.

In 304, the field detection module 114 detects, identifies, and/or identifies each data field of the scrollable user interface.

In 306, the field detection module 114 informs the reflection element module 116 of data fields detected, identified, and/or determined for the scrollable user interface.

In 308, the reflection element module 116, generates and/or associates a reflection element with each data field of the scrollable user interface. According to some aspects, a reflective element may be displayed and/or rendered whenever a data field is selected, hovered over, and/or the like. For example, a reflective element may be displayed and/or rendered based on the proximity of an interactive element (e.g., a curser, a pointer, a selector, etc.) to the data field. According to some aspects, a reflective element may be displayed and/or rendered whenever data is input into a data field of a scrollable interface.

In 310, the reflection element module 116, receives and/or detects interaction with a reflective element. The reflection element module 116 may inform the data reflection window renderer 118 of the interaction with the reflective element.

In 312, the data reflection window renderer 118 generates, renders, and/or causes to be displayed a data reflection window that represents and/or presents the data input into the data field for reference.

In 314, the data reflection window renderer 118 generates, renders, and/or causes to be displayed fields for the data reflection window. Each field of the data reflection window may correspond to a data field of the scrollable user interface for which an interaction with a respective reflective element has occurred.

In 316, the data reflection window renderer 118 generates, renders, and/or causes to be displayed cancellation elements for each field within the data reflection window. A cancellation element may be used to remove and/or cancel a field from the data reflection window. Each field of the data reflection window may correspond to a data field of the scrollable user interface for which an interaction with a respective reflective element has occurred.

In 318, the data reflection window renderer 118 informs the indicator element renderer 120 of each field of the data reflection window.

In 320, the indicator element renderer 120 may generate, render, and/or cause the display of a respective indicator element (e.g., an arrow, a dotted line, etc.) for each field of the data reflection window that indicates correspondence between a data field and the field of the data reflection window.

Figure 4:
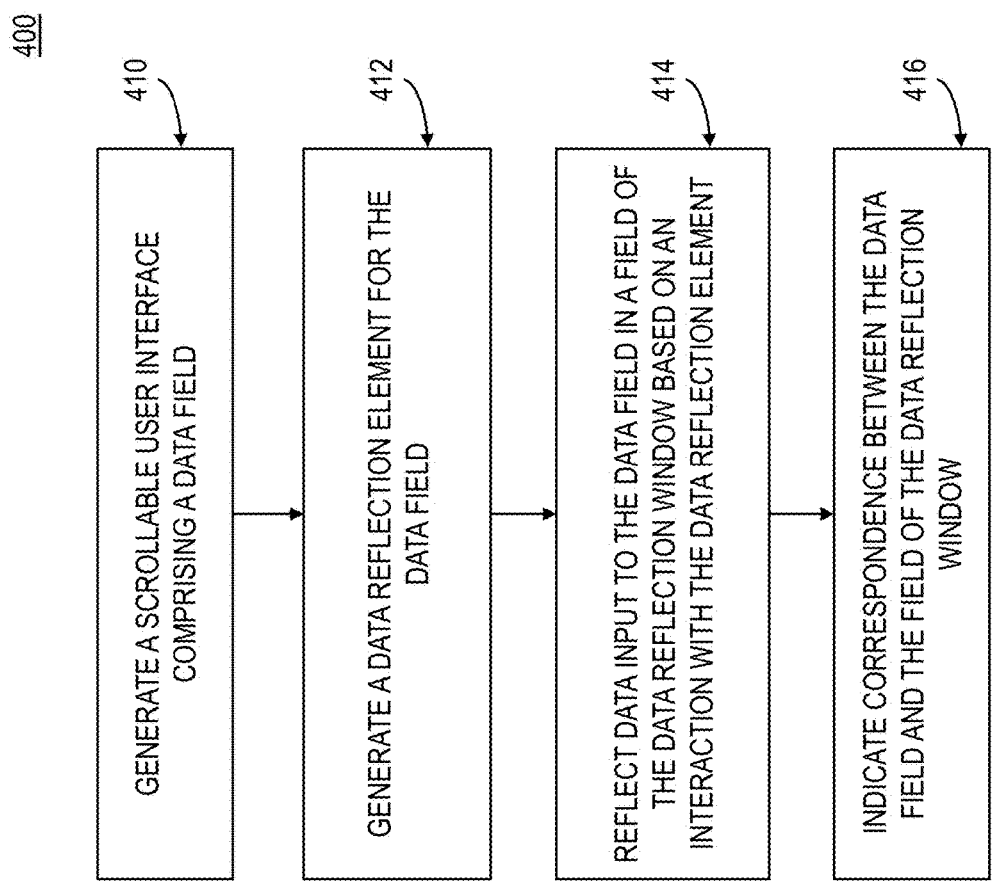
FIG. 4 shows a flowchart of an example method for reflecting data input into fields of a scrollable user interface, according to some aspects.

FIG. 4 shows a flowchart of an example method 400 for reflecting data input into fields of a scrollable user interface, according to some aspects. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art. Method 400 shall be described with reference to FIGS. 1-3. However, method 400 is not limited to the aspects of those figures.

In 410, user device 104 generates a scrollable user interface comprising a data field.

In 412, user device 104 generates a data reflection element for the data field that is displayed based on the proximity of an interactive element to the data field. The interactive element may include, for example, a mouse, a curser, a haptic interface, a user-controlled indicator, and/or the like. The data reflection window may be displayed at a location of the scrollable user interface that remains fixed when the scrollable user interface is scrolled. The location of the scrollable user interface may be changed according to selection and/or interaction, for example, via the interactive element.

In 414, user device 104 causes data input to the data field to be displayed in a field of a data reflection window of the scrollable user interface. For example, the user device may cause the data input to the data field to be displayed in the field of the data reflection window based on an interaction with the data reflection element via the interactive element.

In 416, user device 104 causes the display of an indication element that indicates correspondence between the data field and the field of the data reflection window.

According to some aspects, the method 400 may include the user device 104 adjusting a position of at least a portion of the indication element to correspond to the position of the data field. For example, the user device 104 may adjust the position of at least the portion of the indication element to correspond to the position of the data field based on the position of the data field. The indication element may include, for example, a dotted line, an arrow, and/or the like. The user device 104 causes the display of the indication element to be removed when the position of the data field exits a viewable area of the scrollable user interface.

According to some aspects, the method 400 may include the user device 104 causing data input to the another data field to be displayed in another field of the data reflection window. For example, the user device 104 may cause the data input to the another data field to be displayed in the another field of the data reflection window based on an interaction with another data reflection element for another data field of the scrollable user interface. The interaction with the another data reflection element may be executed, performed, and/or received via the interactive element. The user device 104 may cause the display of another indication element that indicates correspondence between the another data field and the another field of the data reflection window. According to some aspects, a sequence of display of field of the data reflection window and the another field of the data reflection window may correspond to a sequence of the interaction with the data reflection element and the interaction with the another data reflection element.

According to some aspects, the method 400 may further include the user device 104 generating a scrollable element for the data reflection window. For example, the user device 104 may generate the scrollable element for the data reflection window based on fields of additional fields of the data reflection window exceeding a field display threshold for the data reflection window. The scrollable element may include, for example, a scroll bar, a directional arrow(s), a graphical indicator, and/or the like. The user device 104 may cause at least a portion of the fields of the additional fields to be displayed within the data reflection window. For example, the user device 104 may cause at least a portion of the fields of the additional fields to be displayed within the data reflection window based on an interaction with the scrollable element.

Figure 5:
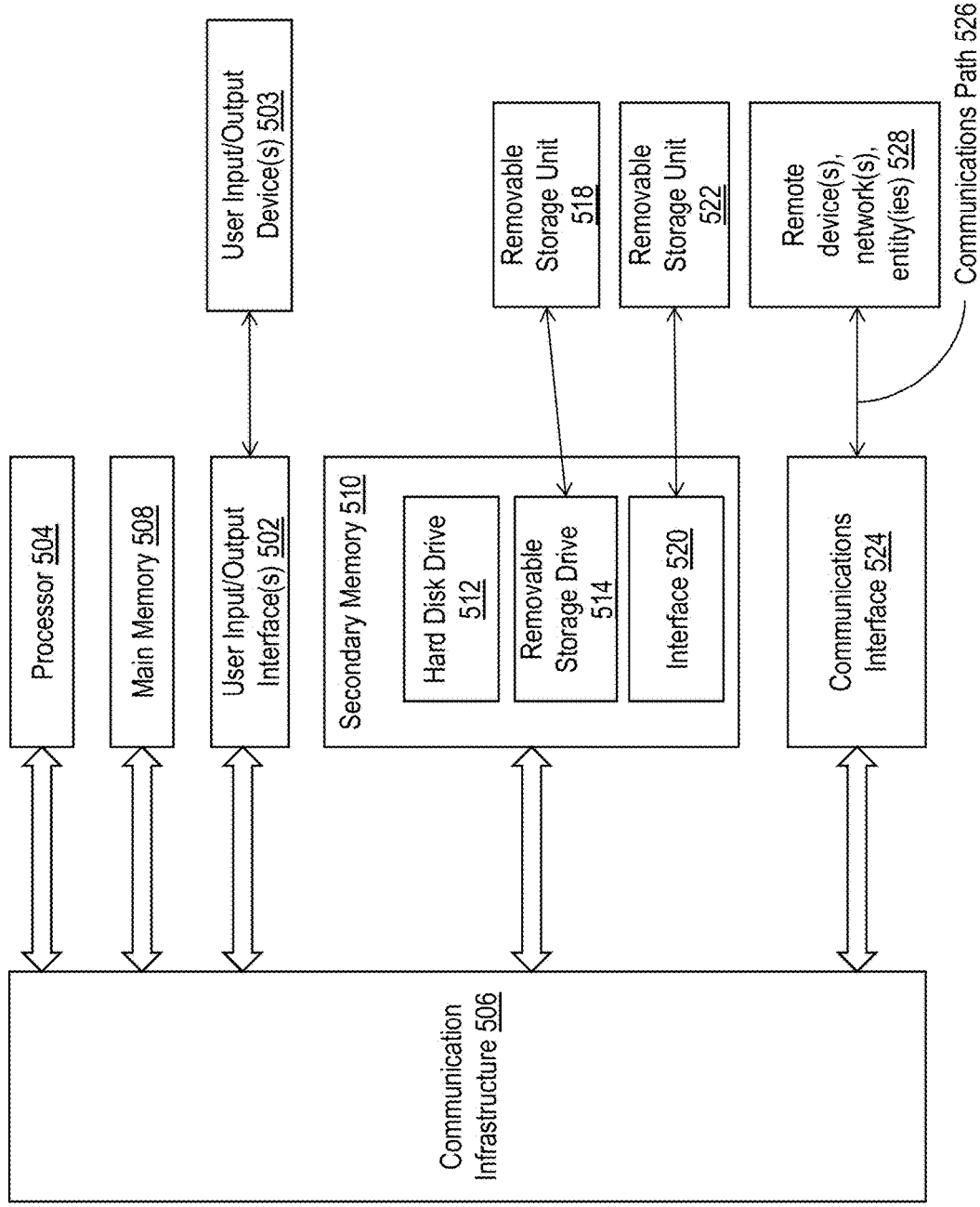
FIG. 5 shows a schematic block diagram of an example computer system in which aspects described may be implemented.

FIG. 5 is an example computer system useful for implementing various embodiments. Various embodiments may be implemented, for example, using one or more well-known computer systems, such as computer system 500 shown in FIG. 5. One or more computer systems 500 may be used, for example, to implement any of the embodiments discussed herein, as well as combinations and sub-combinations thereof. According to some aspects, the user device 104 of FIG. 1 (and/or any other device/component described herein) may be implemented using the computer system 500. According to some aspects, the computer system 500 may be used to implement method 400 and/or any other methods and/or steps described herein.

Computer system 500 may include one or more processors (also called central processing units, or CPUs), such as a processor 504. Processor 504 may be connected to a communication infrastructure or bus 506.

Computer system 500 may also include user input/output device(s) 502, such as monitors, keyboards, pointing devices, etc., which may communicate with communication infrastructure or bus 506 through user input/output device(s) 502.

One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main or primary memory 508, such as random access memory (RAM). Main memory 508 may include one or more levels of cache. Main memory 508 may have stored therein control logic (i.e., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, a tape backup device, and/or any other storage device/drive.

Removable storage drive 514 may interact with a removable storage unit 518. The removable storage unit 518 may include a computer-usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 may read from and/or write to the removable storage unit 518.

Secondary memory 510 may include other means, devices, components, instrumentalities, and/or other approaches for allowing computer programs and/or other instructions and/or data to be accessed by computer system 500. Such means, devices, components, instrumentalities, and/or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 may further include a communication or network interface 524. Communication interface 524 may enable computer system 500 to communicate and interact with any combination of external devices, external networks, external entities, etc. (individually and collectively referenced by reference number 528). For example, communication interface 524 may allow computer system 500 to communicate with external or remote devices 528 over communications path 526, which may be wired and/or wireless (or a combination thereof), and which may include any combination of LANs, WANs, the Internet, etc. Control logic and/or data may be transmitted to and from computer system 500 via communication path 526.

Computer system 500 may also be any of a personal digital assistant (PDA), desktop workstation, laptop or notebook computer, netbook, tablet, smartphone, smartwatch or other wearables, appliance, part of the Internet-of-Things, and/or embedded system, to name a few non-limiting examples, or any combination thereof Computer system 500 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 500 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats, and/or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

Additionally and/or alternatively, while this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

One or more parts of the above implementations may include software. Software is a general term whose meaning of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "an aspect," "aspects," "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for reflecting data input into fields of a scrollable user interface:
    generating a scrollable user interface comprising a data field;
    generating a data reflection element for the data field that is displayed based on proximity of an interactive element to the data field;
    causing, based on an interaction with the data reflection element via the interactive element, data input to the data field to be reflected in a field of a data reflection window of the scrollable user interface so that the data in the data field of the data reflection window matches the data input, wherein the data reflection window is displayed at a location of the scrollable user interface that remains fixed when the scrollable user interface is scrolled; and
    causing display of an indication element that indicates correspondence between the data field and the field of the data reflection window, wherein a position of at least a portion of the indication element is adjustable to correspond to different positions of the data field.

2. The method of claim 1, further comprising positioning, based on a different interaction with the data reflection element via the interactive element, the data reflection window at a different location of the scrollable user interface that remains fixed when the scrollable user interface is scrolled.

3. The method of claim 1, further comprising:
    causing the display of the indication element to be removed when a position of the data field exits a viewable area of the scrollable user interface.

4. The method of claim 1, further comprising:
    causing, based on an interaction with another data reflection element for another data field of the scrollable user interface, another data input to the another data field to be reflected in another field of the data reflection window; and
    causing display of another indication element that indicates correspondence between the another data field of the scrollable user interface and the another field of the data reflection window.

5. The method of claim 4, wherein a sequence of display of field of the data reflection window and the another field of the data reflection window corresponds to a sequence of the interaction with the data reflection element and the interaction with the another data reflection element.

6. The method of claim 1, further comprising:
    generating, based on fields of additional fields of the data reflection window exceeding a field display threshold for the data reflection window, a scrollable element for the data reflection window; and
    causing, based on an interaction with the scrollable element, at least a portion of the fields of the additional fields to be displayed within the data reflection window.

7. The method of claim 4, further comprising:
adjusting, based on a position of the another data field of the scrollable user interface, a position of at least a portion of the another indication element to correspond to the position of the data field; and
causing the display of the another indication element to be removed when the position of the another data field of the scrollable user interface exits a viewable area of the scrollable user interface.

8. A non-transitory computer-readable medium having instructions stored thereon that, when executed by at least one computing device, causes the at least one computing device to perform operations comprising:
generating a scrollable user interface comprising a data field;
generating a data reflection element for the data field that is displayed based on proximity of an interactive element to the data field;
causing, based on an interaction with the data reflection element via the interactive element, data input to the data field to be displayed in a field of a data reflection window of the scrollable user interface so that the data in the data field of the data reflection window matches the data input, wherein the data reflection window is displayed at a location of the scrollable user interface that remains fixed when the scrollable user interface is scrolled; and
causing display of an indication element that indicates correspondence between the data field and the field of the data reflection window, wherein a position of at least a portion of the indication element is adjustable to correspond to different positions of the data field.

9. The non-transitory computer-readable medium of claim 8, the operations further comprising positioning, based on a different interaction with the data reflection element via the interactive element, the data reflection window at a different location of the scrollable user interface that remains fixed when the scrollable user interface is scrolled.

10. The non-transitory computer-readable medium of claim 8, further comprising:
causing the display of the indication element to be removed when a position of the data field exits a viewable area of the scrollable user interface.

11. The non-transitory computer-readable medium of claim 8, the operations further comprising:
causing, based on an interaction with another data reflection element for another data field of the scrollable user interface, another data input to the another data field to be reflected in another field of the data reflection window; and
causing display of another indication element that indicates correspondence between the another data field and the another field of the data reflection window.

12. The non-transitory computer-readable medium of claim 11, wherein a sequence of display of field of the data reflection window and the another field of the data reflection window corresponds to a sequence of the interaction with the data reflection element and the interaction with the another data reflection element.

13. The non-transitory computer-readable medium of claim 8, further comprising:
generating, based on fields of additional fields of the data reflection window exceeding a field display threshold for the data reflection window, a scrollable element for the data reflection window; and
causing, based on an interaction with the scrollable element, at least a portion of the fields of the additional fields to be displayed within the data reflection window.

14. The non-transitory computer-readable medium of claim 11, further comprising:
adjusting, based on a position of the another data field of the scrollable user interface, a position of at least a portion of the another indication element to correspond to the position of the data field; and
causing the display of the another indication element to be removed when the position of the another data field of the scrollable user interface exits a viewable area of the scrollable user interface.

15. A system comprising:
a memory; and
at least one processor coupled to the memory and configured to perform operations comprising:
generating a scrollable user interface comprising a data field;
generating a data reflection element for the data field that is displayed based on proximity of an interactive element to the data field;
causing, based on an interaction with the data reflection element via the interactive element, data input to the data field to be reflected in a field of a data reflection window of the scrollable user interface so that the data in the data field of the data reflection window matches the data input, wherein the data reflection window is displayed at a location of the scrollable user interface that remains fixed when the scrollable user interface is scrolled; and
causing display of an indication element that indicates correspondence between the data field and the field of the data reflection window, wherein a position of at least a portion of the indication element is adjustable to correspond to different positions of the data field.

16. The system of claim 15, the operations further comprising positioning, based on a different interaction with the data reflection element via the interactive element, the data reflection window at a different location of the scrollable user interface that remains fixed when the scrollable user interface is scrolled.

17. The system of claim 15, further comprising:
causing the display of the indication element to be removed when a position of the data field exits a viewable area of the scrollable user interface.

18. The system of claim 15, the operations further comprising:
causing, based on an interaction with another data reflection element for another data field of the scrollable user interface, another data input to the another data field to be reflected in another field of the data reflection window; and
causing display of another indication element that indicates correspondence between the another data field of the scrollable user interface and the another field of the data reflection window.

19. The system of claim 15, further comprising:
generating, based on fields of additional fields of the data reflection window exceeding a field display threshold for the data reflection window, a scrollable element for the data reflection window; and
causing, based on an interaction with the scrollable element, at least a portion of the fields of the additional fields to be displayed within the data reflection window.

20. The system of claim 18, further comprising:
adjusting, based on a position of the another data field of the scrollable user interface, a position of at least a portion of the another indication element to correspond to the position of the data field; and
causing the display of the another indication element to be removed when the position of the another data field of the scrollable user interface exits a viewable area of the scrollable user interface.

\* \* \* \* \*